May 23, 1939.　　　　W. K. McCOY　　　　2,159,705
SEALING MEANS FOR THERMOCOUPLES
Filed June 3, 1937

Inventor
William K. McCoy
By G. M. Houghton
Lui Attorney

Patented May 23, 1939

2,159,705

UNITED STATES PATENT OFFICE 2,159,705

SEALING MEANS FOR THERMOCOUPLES

William K. McCoy, Pittsburgh, Pa., assignor to Gulf Oil Corporation, Pittsburgh, Pa., a corporation of Pennsylvania Application June 3, 1937, Serial No. 146,291

2 Claims. (Cl. 136—4)

This invention or discovery relates to sealing means for thermocouples; and it comprises, in combination with a thermocouple and well therefor, a capping member for the well, two conducting elements extending through the capping member, insulation between the two elements, the capping member and insulation being arranged to resist pressure developing in the well, means for retaining the capping member and the elements in fixed relation to the well, the thermocouple being connected to the two conducting elements at one side of the capping member, and electrical connections for the thermocouple attached to the conducting elements at the other side of the capping member; all as more fully hereinafter set forth and as claimed.

In oil refining it is customary to provide thermocouples at various points in the stills and other apparatus, through which oil passes, in order to regulate the operations properly. Mounting of thermocouples in a high pressure apparatus presents difficulties. The oil, in liquid or vapor state and under extremely high temperature and pressure, tends to leak out if given any opportunity, and all connections must be exceedingly tight.

In typical thermocouple mountings, the thermocouple proper (a junction of wires of dissimilar metals) is enclosed within a well, that is, a tube closed at one end, and the well extends into the piping, etc., in direct contact with the oil or vapor. These wells sometimes break, due to various causes, and when they do, oil or vapor under full still pressure escapes into the well, bursts the electrical connections and throws the thermocouple fitting out of action. When this happens the still must be shut down immediately for repair. Thermocouple fittings, and more particularly the well fittings, have hitherto proved to be a weak point in oil refining apparatus, but no satisfactory remedy has been devised.

The present invention is directed to removing y possibility of escape of gas or oil through a thermocouple well, or rupture of the electrical connections, in the event of breakage of the well. According to the invention, there is provided, in combination with a thermocouple well, a capping member therefor and two conducting members extending through the cap and so arranged as to take the entire pressure if any develops in the well, without putting any strain on the thermocouple connections themselves. The seal can readily be made as tight as the well itself or tighter.

Two examples of a specific embodiment of the invention are shown in the accompanying drawing, in which.

Figure 1:
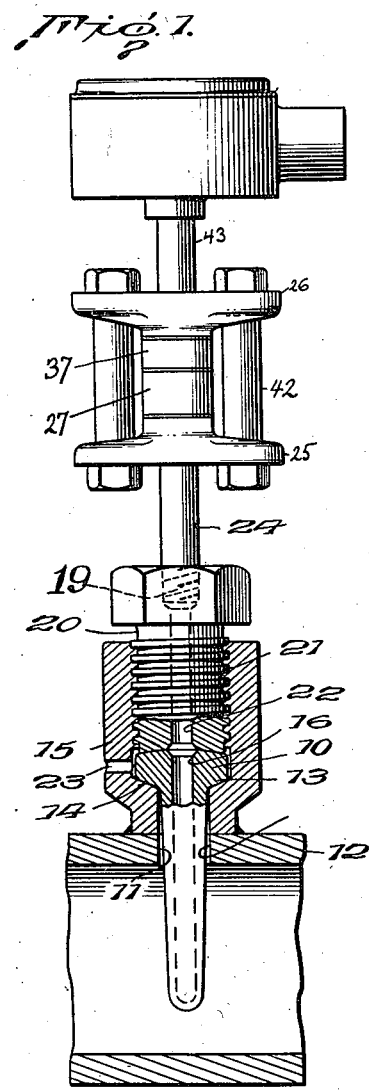
Fig. 1 is a view partly in elevation, partly in vertical section, of the sealing means attached to a thermocouple well installed in a still tube.
Figure 2:
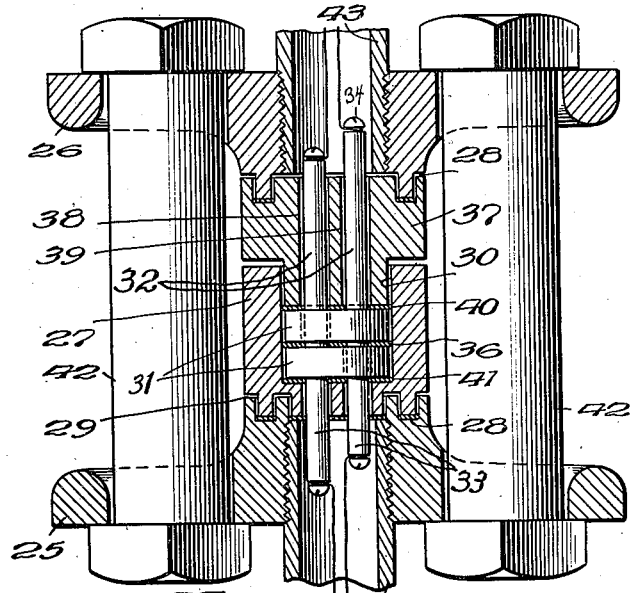
Fig. 2 is an enlarged detail view, partly in vertical section, of the sealing means of Fig. 1.
Figure 3:
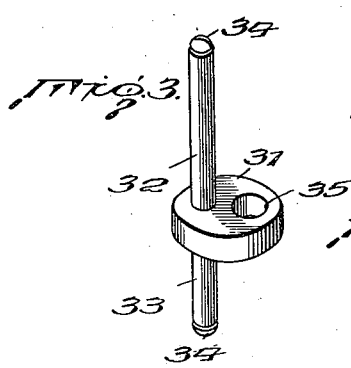
Fig. 3 is a perspective view of one of the conducting members of Fig. 2.

In the showings, in which like reference characters indicate like parts, Fig. 1 shows a thermocouple well 10 extending through an orifice 11 into a section of still tubing 12 and having a flange portion 13 seated on a corresponding conical seal 14 of a socket member 15, as shown. The well is bored as at 16 to receive a thermocouple 17 (Fig. 4) formed of two wires of different metals joined at 17A. The well is retained firmly in place by a screw 20 threadedly engaging the socket member as at 21 and bored at 22 for passage of the thermocouple wires. A vent 23 is provided in the socket member to serve as a leak detector. The sealing means comprises a conduit 24 threadedly attached to screw 20 as shown at 19, and attached to one of two flanges 25 and 26. A capping member 27 covers the mouth of the conduit. The capping member and flange 25 are grooved as shown at 29 and gasketing material 28 is provided so as to ensure a tight seal between the capping member and the flange. The capping member has an inner cavity 30, in which are arranged two conducting members, shown as exactly alike and each comprising a substantially discoid plate 31 (Fig. 3) having eccentric extensions 32 and 33 with screws 34 at the ends thereof for attachment of wires, and having an eccentric bore 35 of diameter larger than that of the extensions. The discoid plates are of slightly smaller diameter than cavity 30, as shown, so as to be out of electrical contact therewith. The conducting elements are best made of unitary construction. The two conducting members are assembled as indicated in Fig. 2 with an insulating gasket 36 between them. Extensions 32 and 33 pass through the bores 35 in the manner shown, without touching the bores, and thus the two conducting elements are insulated from each other. The conducting elements are retained in place by a plug 37 bored as at 38 and 39 with oversize holes, for reception of extensions 32 and 33. Insulation is provided as at 40 and 41 between the conducting members and the plug and capping member respectively. The portion of plug 37 entering cavity 30 is slightly less in diameter than the cavity, as shown, preventing electrical contact. The upper portion of the plug is grooved and insulation provided as in the case of the lower flange. The upper flange engages the plug, as shown. The entire assemblage is held together by bolts 42 engaging the flanges. Conduit means 43 are attached to the upper flange and the electrical connections for the thermocouple extend therethrough as shown.

It is seen that the construction described provides an exceedingly tight seal. Upon development of pressure inside conduit 24 from any cause, this is resisted by the plate-like members which are held in place by bolts 42. The seal is quite as strong as the well and conduit 24. On the other hand, it can be readily taken down complete for inspection or repair, by merely removing screws 42.

Figure 4:
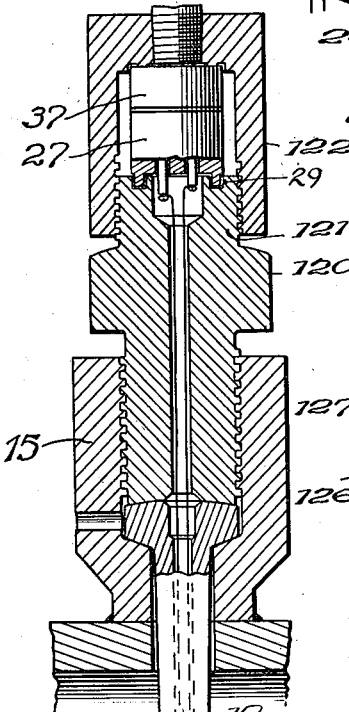
Fig. 4 shows another way of attaching the sealing means to the thermocouple well.

Fig. 4 shows an alternative construction wherein the seal is applied directly to the thermocouple mounting. In this embodiment, screw 20 is replaced by a screw 120 which has an upper threaded extension 121 for reception of a cap 122. Cap 122 takes the place of upper flange 26 and upon being screwed in place, presses elements 37 and 27 in place, as shown. The rest of the construction is similar to that of Figs. 1 to 3, and needs no description.

Figure 5:
Fig. 5 shows a modified seal construction.

Fig. 5 shows a modification which is simpler and which can be used when pressures are not unduly high. As shown, a cap 125 is provided, arranged to engage grooves 29 in the lower flange (Fig. 2) or in the screw 120 (Fig. 4). The cap has two tapered holes 126 extending therethrough, as shown. Metal rods 127 surrounded by tapered insulation 128 extend through the bores. The ends of the rods are threaded and carry nuts 129 for attachment to the thermocouple and to the wiring respectively. Upon development of pressure in the well, the rods and insulation tend to be forced into the tapered bores, but no strain is put on the thermocouple itself. The insulating material (128) is of a kind having considerable strength even when subjected to high temperature or pressure, and may conveniently be porcelain.

What I claim is:

1. Pressure sealing means for thermocouples comprising, in combination with a thermocouple well and thermocouple in the well, a capping member in pressure-tight communication with the well, two metal plates in the capping member in stacked arrangement of a plane perpendicular to the well axis, means so constructed and arranged as to insulate the plates electrically from each other and from the capping member, each plate having two metal posts one projecting outward from each side thereof, each plate having a portion thereof cut away so that one post of each plate projects through the cut-away portion of the opposite plate beyond the opposite plate out of electrical contact with the opposite plate, closure means for the capping member orificed to receive two adjacent posts and out of electrical contact with the posts, means for clamping the closure means, plates and capping member together, electrical connections to said two posts and electrical connections from the other two adjacent posts to the thermocouple.

2. Pressure sealing means for thermocouples comprising, in combination with a thermocouple well and a thermocouple in the well, a capping member in pressure-tight communication with the well, two orificed metal plates positioned in the capping member in stacked arrangement in a plane perpendicular to the well axis, means so constructed and arranged as to insulate the plates electrically from each other and from the capping member, each plate having two metal posts one projecting outward from each side thereof, one post of each plate projecting through the orifice of the other plate and beyond said other plate and out of electrical contact with said other plate, closure means for the capping member orificed to receive two adjacent posts and out of electrical contact with the posts, means for clamping the closure member, plates and capping member together, electrical connections to said two posts and electrical connections from the other two adjacent posts to the thermocouple WILLIAM K. McCOY.